(12) United States Patent
Nayebi et al.

(10) Patent No.: US 6,175,463 B1
(45) Date of Patent: Jan. 16, 2001

(54) ARCHITECTURE FOR HARD DISK DRIVE WRITE PREAMPLIFIERS

(75) Inventors: Mehrdad Nayebi, Palo Alto; Murat Hayri Eskiyerli, San Jose; Phil Shapiro, Palo Alto, all of CA (US)

(73) Assignees: Sony Corporation, Tokyo (JP); Sony Electronics Inc., Park Ridge, NJ (US)

( * ) Notice: Under 35 U.S.C. 154(b), the term of this patent shall be extended for 0 days.

(21) Appl. No.: 09/282,867

(22) Filed: Mar. 31, 1999

(51) Int. Cl.[7] ................ G11B 5/02; G11B 5/09; H03B 1/00
(52) U.S. Cl. .................. 360/68; 360/46; 327/110
(58) Field of Search .............. 360/46, 68; 327/110

(56) References Cited

U.S. PATENT DOCUMENTS 5,331,479 * 7/1994 Madsen ................... 360/68
5,869,988 * 2/1999 Jusuf et al. ............... 327/110
6,052,017 * 4/2000 Pidutti et al. ............. 327/424

* cited by examiner

*Primary Examiner*—W. Chris Kim
(74) *Attorney, Agent, or Firm*—Mayer, Fortkort & Williams, LLC; Karin L. Williams, Esq.

(57) ABSTRACT

A hard disk drive write channel architecture improves the rise-time while utilizing a same supply voltage to provide a boosted voltage, thereby improving the rise-time only when it is needed. The voltage is then connected to the inductive write head through a switch after an appropriate delay, so as to compensate for the delay between the switching of Data line and the peaking of the voltage at the corresponding write terminal. In addition, the same delayed version of the Data line is applied to the inputs of the switching circuit to delay the signal inputs such that the delay timing matches appropriately.

5 Claims, 3 Drawing Sheets

ARCHITECTURE FOR HARD DISK DRIVE WRITE PREAMPLIFIERS

CROSS-REFERENCE TO RELATED APPLICATIONS

The present invention is related to an invention that is the subject matter of a commonly-assigned co-pending application entitled "Voltage Boost Circuitry For Hard Disk Drive Write Preamplifiers", filed concurrently herewith, which is incorporated by reference herein and is also related to an invention that is the subject matter of a commonly-assigned co-pending application entitled "Fast High Side Switch for Hard Disk Drive Preamplifiers", also filed concurrently herewith, also incorporated by reference herein.

1. Field of the Invention

The present invention relates generally to an architecture for hard disk drive write preamplifiers, and, more particularly, to an architecture for increasing the rise-time, i.e., the time that it takes the current in a hard disk drive write head to be reversed, by boosting the supply voltage only when it is needed, and also, so as to compensate for the delay in engaging boost voltage, an architecture which will delay the data signals by the same amount of time that it takes to engage the boosting value.

2. Background of the Invention

Write speeds in hard disk drive preamplifiers are continually improving. An inductive write head includes an inductive coil that can change the localized magnetic fields on the magnetic data-storage medium and thus allows the digital data to be recorded. The speed of this recording process (i.e., the write speed) is determined by how fast the current in a hard disk drive write head can be reversed (the polarity of the write current through the write head being reversed in response to the bit pattern of the information signal). This is also referred to as the "rise-time". Typically, the desired requirements for the write driver are a large current capability (e.g., 40–80 ma) combined with a fast rise time (e.g., 1–4 ns) for driving the inductive write head.

The write head for a disk data storage device can be approximately modeled by an inductor with an inductance of L. The voltage across an inductor is ideally proportional to the rate of change of the current through the inductor in time. The mathematical expression for this voltage is given as $V_L = L\, di/dt$. Essentially, the voltage across the inductive write head, $V_L$, is proportional to the value of inductance, L, and to the speed at which the write current is reversed, di/dt. This means that the write current reversal time in inductive write-heads fundamentally depends on how large a voltage can be impressed across the write drive head. Normally, the voltage across the inductor is limited by the supply voltages. Thus, either the head inductance value should be decreased, or, the supply voltage should be increased, to improve the write speed. The first option, decreasing the head inductance value, is normally not preferred, as it negatively affects the reliability of the data-recording process.

Conventional techniques use the power supply to generate the voltage across the inductor. However, the voltage supply limits the voltage that can be applied across the inductor and therefore limits the rise time. Higher write speeds require higher supply voltages. However, the second alternative, increasing the supply voltage, may not always be possible, as system-wide considerations dictate the selection of power supply voltages, and the present trend in fact is the reduction of power supply voltages.

A simplified diagram of an inductive write head with current switching circuitry is shown in FIG. 1. A standard H-bridge is used to drive the write head, which is modeled by the inductor L1. The arrangement shown in FIG. 1 is known as an "H-bridge" or an "H-switch" because the four switches, or commonly transistors (operating between conductive (activated) and non-conductive states as switches), and the inductor, operate in an "H-like" formation. In particular, one pair of switches direct current flow in a first diagonal direction through the inductor and the other pair directs current flow in a second opposite diagonal direction through the inductor.

The write-head is connected to first and second write terminals of the H-Bridge (T1 and T2 of FIG. 1). Transistors Q2 and Q4 have their collectors connected to voltage source $V_{CC}$ and their emitters connected to the respective collectors of transistors Q1 and Q3. The emitters of transistors Q1 and Q3 are then coupled together and coupled to ground. When the "Data" line to transistors Q2 and Q3 (which form a first diagonal pair) is high, "Data_bar" is low, and transistors Q4 and Q1 (which form a second diagonal pair) are low. Accordingly, the first diagonal pair conducts current causing inductor L1 to have a first polarity, i.e., the collector of transistor Q2 is at $V_{CC}$ (e.g., 5 volts) and the emitter of transistor Q2, i.e., T1, is slightly below that (e.g., 4.4 volts). Transistor Q3 is pulled high, and point T2 is pulled down to approximately 0 volts. Therefore, the current flows from the first write terminal T1 (at 4.4 volts) to the second write terminal T2 (at approximately 0 volts) through the inductor L1. This can be called "state 1".

Reversing the polarity across inductor L1 entails deactivating the first diagonal pair, Q2 and Q3, and activating the second diagonal pair, Q1 and Q4, by switching inputs "Data" and "Data_bar" from high to low and low to high, respectively. Specifically, when the "Data" line goes low, and "Data_bar" goes high, transistors Q2 and Q3 turn off and transistors Q1 and Q4 turn on. Eventually, the current flows in the other direction, from the second write terminal T2 to the first write-terminal T1, which can be similarly called "slate 2", thus generating a field having a second polarity, opposite to the first. This enables the inductive coil L1 to write a specific bipolar magnetic pattern on a magnetic medium.

However, the current in inductor L1 does not change instantaneously. Because "Data_bar" is pulled high, terminal T1 is essentially pulled to ground, and transistor Q3 is now "off". Therefore, terminal T2 should flow infinitely high. However, stray capacitances do not allow that to happen, for example, bipolar junction transistors have parasitic base to collector (BTC) capacitances that preclude instantaneous changes between conductive (activated) and nonconductive states and prevents the voltage at T2 from flying high.

In order to reverse the current flow from "T1 to T2" to "T2 to T1" very quickly, the voltage at terminal T2 must be made greater than the voltage at terminal T1. As noted above, when "Data_bar" is pulled high, terminal T1 is pulled to ground, and it is desired to change the voltage at terminal T2 to as high a voltage as possible, as quickly as possible.

The H-bridge circuit shown in FIG. 2, also conventional, provides a more practical approach. Again, when the "Data" line is high, transistors Q2 and Q3 are ON, therefore, the write current flows from the first write terminal (T1) to the second write terminal (T2) through the write head, modeled by inductor L1. The voltages at both write terminals, T1 and T2, are one diode drop ($V_{be}$) (due to diodes D1 and D2) below supply voltage $V_{CC}$. When the "Data" line goes low, transistors Q2 and Q3 shut off, "Data_bar" goes high, and transistors Q1 and Q4 turn on. However, the inductor current cannot change instantaneously, therefore the first write terminal T1 of the write head L1 is pulled low (note that this voltage is limited by a clamp (not shown) so that transistor Q1 does not enter into deep-saturation). At this point, the inductor L1 dumps its current into diode D2. This condition produces a voltage drop across the inductor L1 of approximately $V_{CC}+V_{be}-V_{ce,sat}$. This voltage drop determines the rate at which the inductor current decreases. When the inductor current reaches zero (0), the diode D2 turns off and the voltage across the inductor L1 becomes $V_{CC}-V_{ce,sat}$. Therefore, although diodes D1 and D2 provide clamping protection for the H-bridge circuit, this conventional approach still has a problem in that the inductor current rises at a lower rate than the rate at which it decreases during this phase.

The present invention is therefore directed to the problem of developing an architecture that allows for a hard disk drive preamplifier with improved rise-time, i.e., that boosts the supply voltage only when it is needed, while maintaining a same supply voltage. In addition, the architecture must provide adequate compensation for the delay in engaging boost voltage by delaying the data signals by the same amount of time.

SUMMARY OF THE INVENTION

The present invention solves these problems by providing a novel architecture for improving rise-time in a preamplifier so as to provide faster write speeds. In particular, the supply voltage is boosted only when needed, i.e., when the write current across the inductor is being reversed. In addition, to compensate for the delay in engaging the boost value, data signals to the switching circuitry are also delayed by the same amount of time.

In particular, the present invention provides a hard disk drive write channel preamplifier architecture including an inductive write head having a first terminal and a second terminal, a switching circuit for driving current in first and second directions through the inductive write head, first and second boost circuits, for generating a higher voltage than a supply voltage, first and second switches for connecting the first and second boost circuits, respectively, to the first and second terminals, respectively, of the inductive write head, and, a delay circuit for maintaining timing between the switching circuit and the boost circuits.

In one particular embodiment, the switching circuit consists of a first transistor and a second transistor, coupled between a supply voltage and a respective first inductive write head terminal and a second inductive write head terminal, and, a third transistor and a fourth transistor, coupled between a respective emitter of the first transistor and the second transistor and ground.

In a preferred embodiment, the delay circuit delays the application of the boost voltage to the inductive write head by a same amount as the application of the signals to the switching circuit.

The features of the invention believed to be novel are set forth with particularity in the appended claims. The invention itself however may be best understood by reference to the following detailed description taken in conjunction with the accompanying drawings.

DETAILED DESCRIPTION

Figure 1:
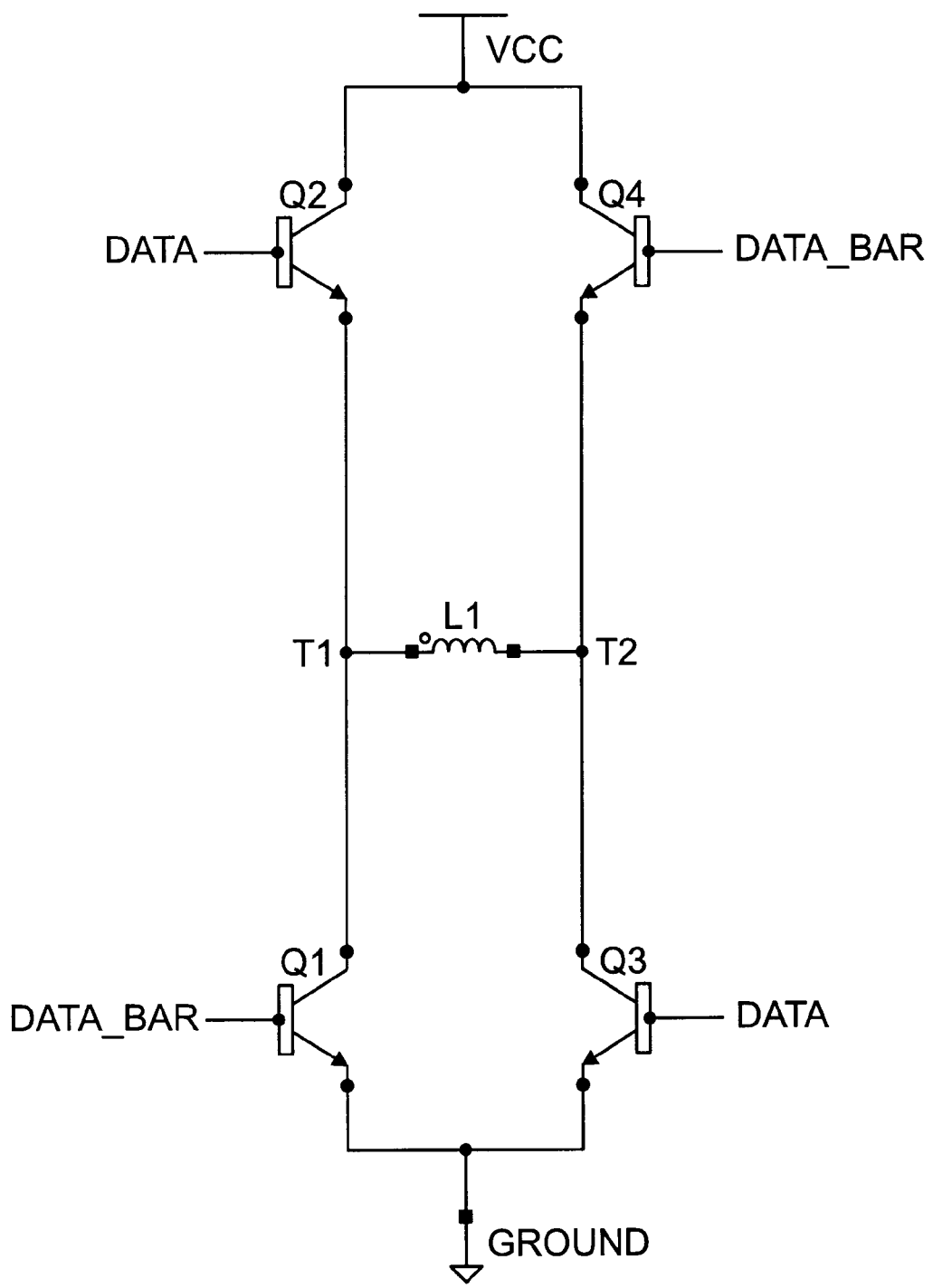
FIG. 1 depicts a simplified schematic diagram of a prior art inductive write head with current switching circuitry.
Figure 2:
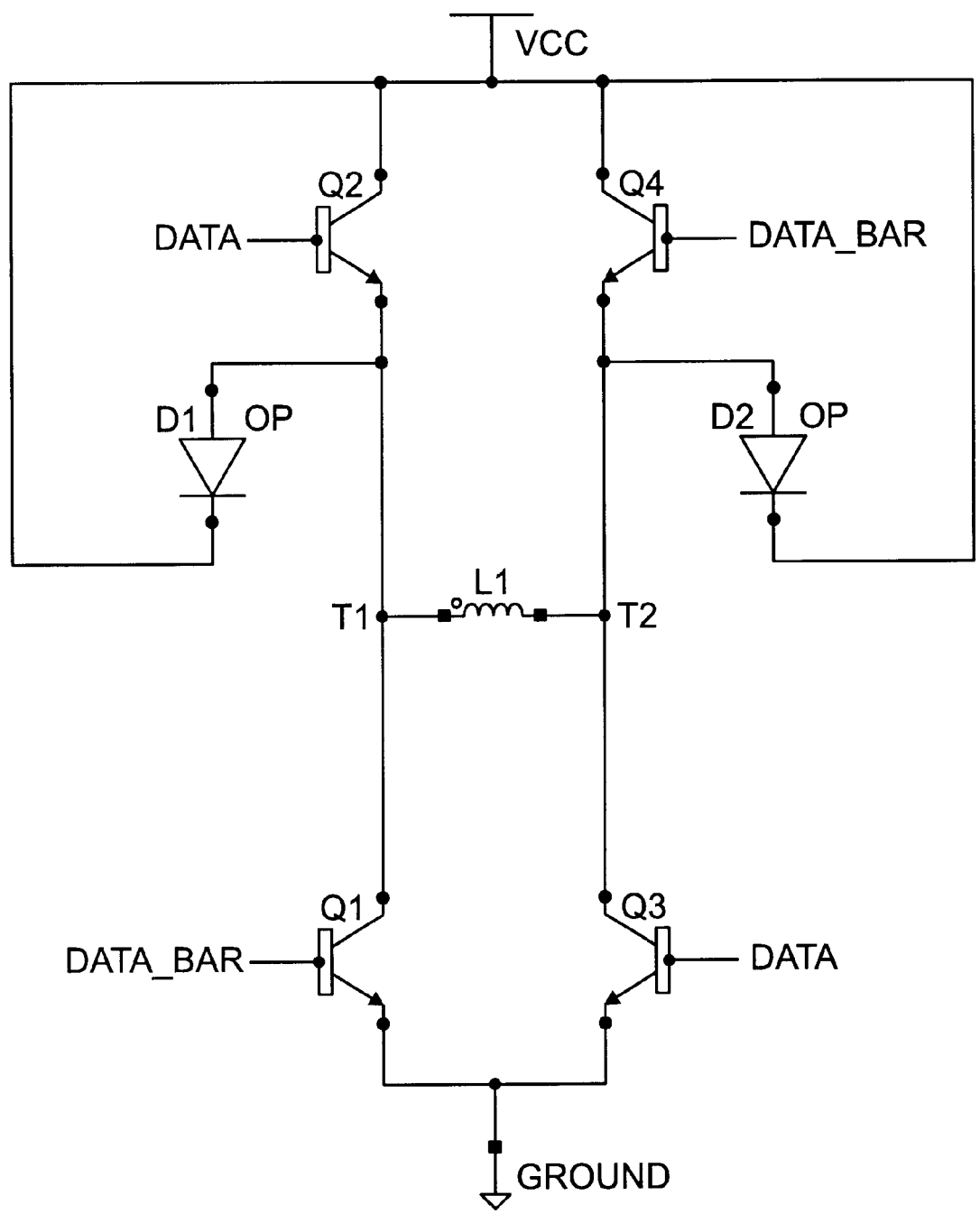
FIG. 2 depicts a simplified schematic diagram of another prior art inductive write head with current switching circuitry.
Figure 3:
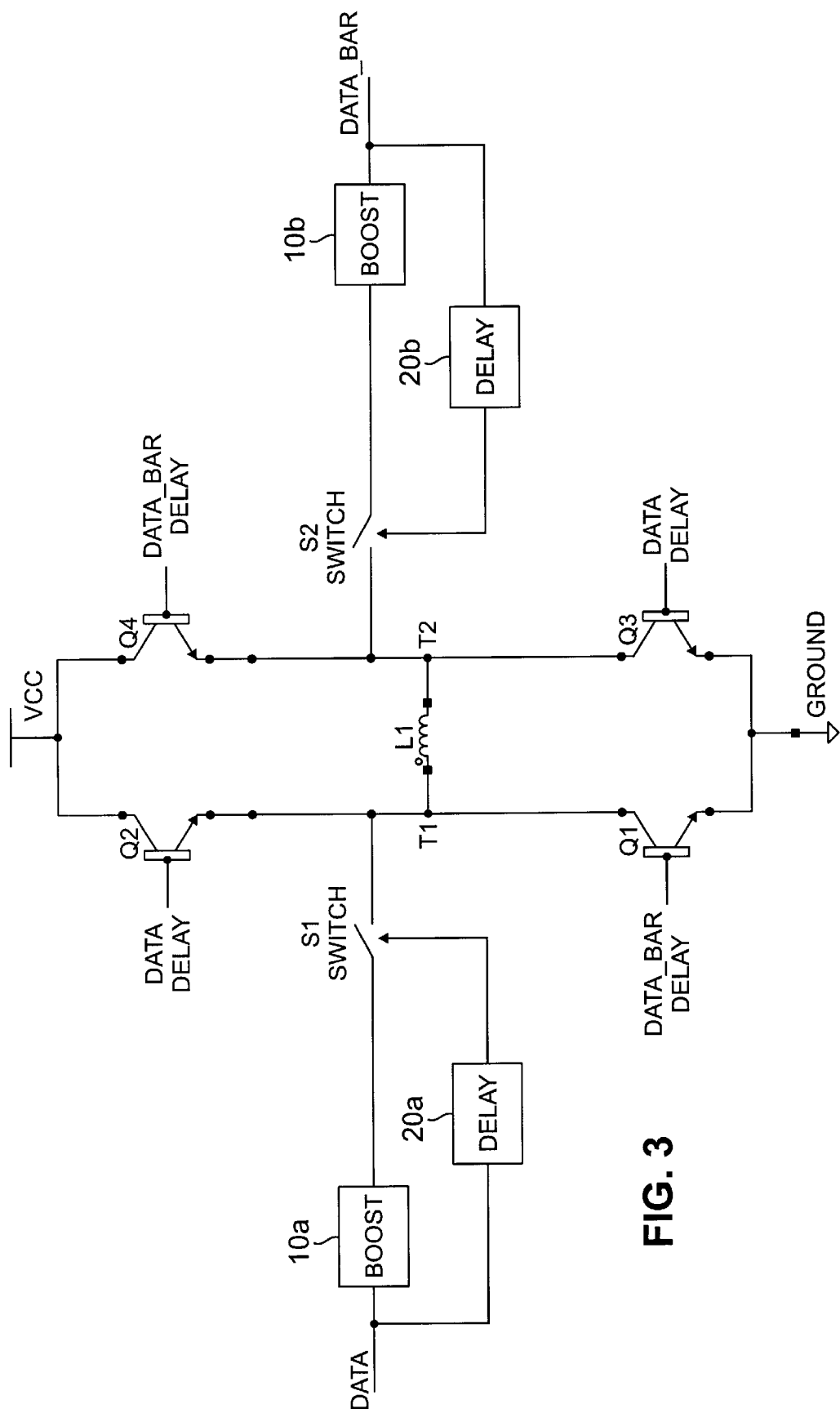
FIG. 3 depicts a schematic diagram of a write channel architecture in accordance with the principles of the present invention.

FIG. 3 shows a hard disk drive write channel architecture that improves the rise-time in accordance with the present invention. Four transistors Q1, Q2, Q3 and Q4, together with inductor L1, form an H-bridge connected between voltage source $V_{CC}$ and ground. Transistors Q2 and Q3 form a first diagonal pair and transistors Q4 and Q1 form a second diagonal pair. Transistors Q2 and Q4 have collectors connected to voltage source $V_{CC}$ and emitters connected to the respective collectors of transistors Q1 and Q3. The emitters of transistors Q1 and Q3 are coupled together and also to ground.

In this architecture, a voltage higher than $V_{CC}$ may be generated, i.e., this architecture utilizes a same supply voltage to provide a boosted voltage (thereby improving the rise-time) only when it is needed (see "Boost" circuits 10a and 10b). As described in detail above, rather than relying on the power supply $V_{CC}$ to provide current to improve the rise-time, a higher voltage is generated to supply current only when necessary. This "added" voltage is called the boost voltage.

The voltage is then connected to inductor L1, through a switch S1 (for "Data", and switch S2 for "Data_bar") after an appropriate delay (see "Delay" circuits 20a and 20b). The switch S1 is "ON" (i.e., a low-impedance state) for a duration of time.

More specifically, there are two stages to the boost circuitry—first, when Data arrives, after an appropriate delay, the "Data" line goes high and the H-bridge switches between states 1 and 2. Again, after an appropriate delay, a switch S1 is closed which supplies a high (i.e., "boosted") voltage to the appropriate side of the write-head. Thus, the voltage applied across the write head is increased independent of the supply voltage $V_{CC}$. This extra voltage applied across the inductor L1 improves the rise-time.

It will be appreciated by those skilled in the art that delay circuits, 20a and 20b, of the proposed architecture, are utilized in conjunction with the boost circuitry 10a and 10b, so as to compensate for the delay between the switching of Data line and the peaking of the voltage at the corresponding write terminal. In addition, the same delayed version of Data and Data_bar must be applied to the inputs of transistors Q2 and Q3 and Q4 and Q1, respectively, to delay the signal inputs to the transistors such that the delay timing matches appropriately.

The rise-time, $t_r$ (and also the fall-time, $t_f$) of the current, $\Delta i$ through the write head can be approximately calculated from the following formula:

$$\frac{\Delta i}{t_r} = \frac{V_L}{L}$$

where $V_L$ and L denote the voltage across the write head and inductance of the write head, respectively. Accordingly, the voltage across the write head is equal to the boost voltage, which can be made larger than the value of the supply voltage (provided the value does not interfere with the operation of the transistors, e.g. breakdown phenomena) and the delay stages (20a and 20b) are provided to compensate for the delay between the switching of the "Data" and "Data_bar" lines and the peaking of the voltage at the corresponding write terminal (T1 or T2).

In addition to the improved rise/fall time, those skilled in the art will appreciate that one must pay careful attention to asymmetry and disparity of rise vs. fall time that degrades second harmonic performance. Boost-trapping has an adverse effect on asymmetry and therefore one needs to pay careful attention to provide a completely symmetric layout for both sides.

The present invention has been described in terms of specific embodiments incorporating details to facilitate the understanding of the principles of operation of the invention. Such reference herein to specific embodiments and details thereof is not intended to limit the scope of the claims appended hereto. For example, while the preferred embodiment of the present invention has been illustrated and described using bipolar transistors, it will be appreciated by those skilled in the art that the circuit of the present invention may be implemented using another device technology, including but not limited to CMOS, MOS, discrete components and ECL. In addition, different circuit configurations could also be substituted to perform the same functions of the preferred embodiment. Various modifications may be made in the embodiments chosen for illustration without departing from the spirit and scope of the invention.

What is claimed is:

1. A hard disk drive write channel preamplifier architecture comprising:

an inductive write head having a first terminal and a second terminal;

switching circuitry for driving current in first and second directions through said inductive write head;

first boost circuitry, for generating a higher voltage than a supply voltage;

second boost circuitry, for generating a higher voltage than a supply voltage;

a first switch for connecting said first boost circuit to the first terminal of said inductive write head;

a second switch for connecting said second boost circuit to the second terminal of said inductive write head; and delay circuitry for maintaining timing between said switching circuitry and said first boost circuitry and said second boost circuitry.

2. The write channel preamplifier architecture according to claim 1, wherein said switching circuitry comprises:

a first transistor and a second transistor, said first transistor and said second transistor coupled between a supply voltage and a respective first inductive write head terminal and a second inductive write head terminal; and a third transistor and a fourth transistor, said third transistor and said fourth transistor coupled between a respective emitter of said first transistor and said second transistor and ground.

3. The write channel preamplifier architecture according to claim 1, wherein said delay circuitry compensates for a delay between switching of data line and a peaking of voltage at the first and second terminals of said inductive write head.

4. The write channel preamplifier architecture according to claim 2, wherein said delay circuitry delays the signal inputs to the base of each of the first transistor, second transistor, third transistor and fourth transistor.

5. The write channel preamplifier architecture according to claim 2, wherein said delay circuitry delays the application of the boost voltage to said inductive write head by a same amount as the application of the signal to the switching circuit.

* * * * *